(12) United States Patent
Laird

(10) Patent No.: US 6,167,900 B1
(45) Date of Patent: Jan. 2, 2001

(54) VALVE STEM WITH SLIDABLE, ROTATABLE AIR-TIGHT COUPLING FOR REMOVABLY ATTACHABLE DEVICES

(76) Inventor: David Norman Laird, 15101 - 60th Avenue, Surrey, British Columbia (CA), V3S 1S1

( * ) Notice: Under 35 U.S.C. 154(b), the term of this patent shall be extended for 0 days.

(21) Appl. No.: 09/249,656

(22) Filed: Feb. 12, 1999

(51) Int. Cl.[7] .................................................. F16K 15/20
(52) U.S. Cl. ........................ 137/227; 73/146.8; 137/557
(58) Field of Search ................... 137/227, 229, 137/223, 557, 551; 73/146.8, 146.3, 146; 374/141, 147

(56) References Cited

U.S. PATENT DOCUMENTS

| | | | |
|---|---|---|---|
| 3,610,269 | * 10/1971 | Adams | 137/115.16 |
| 3,854,497 | * 12/1974 | Rosenberg | 137/557 |
| 4,823,835 | * 4/1989 | Chu | 137/557 |
| 5,027,848 | * 7/1991 | Leeuwen | 137/227 |
| 5,083,457 | * 1/1992 | Schultz | 73/146.5 |
| 5,142,904 | * 9/1992 | Le | 73/146.8 |
| 5,452,608 | * 9/1995 | Green | 73/146.8 |
| 5,526,861 | * 6/1996 | Oshita et al. | 152/415 |
| 5,665,908 | * 9/1997 | Burkey et al. | 73/146.8 |
| 5,853,020 | * 12/1998 | Widner | 137/227 |

* cited by examiner

Primary Examiner—John Rivell
Assistant Examiner—Meredith H Schoenfeld

(74) Attorney, Agent, or Firm—Klarquist Sparkman Campbell Leigh & Whinston, LLP

(57) ABSTRACT

A tire valve stem having an integral pair of O-rings over which a pressure gauge or other device can be mounted by sliding a mating collar provided on the device over the O-rings. The O-rings provide an air-tight seal against the collar, and allow the device to rotate relative to the stem, either during or after mounting, to position the device anywhere within a 360° arc around the stem. The O-rings are located on either side of an orifice which extends through the valve stem, beneath the valve. Air passes from the pressurized valve stem, through the orifice, into an air-tight region between the O-rings, valve stem and collar. A port in the collar allows air to pass through the collar from the air-tight region into the device. A wide variety of devices equipped with collars capable of air-tight, slidable mounting over the O-rings can be provided, such as pressure transducers, pressure sensors, temperature gauges, temperature transducers, temperature sensors, or air conduits for coupling to remote equipment. Any such device can quickly and easily be interchanged with a device previously mounted on the valve stem by sliding the previously mounted device's collar off the valve stem, then sliding another device's collar over the O-rings. For initial shipping purposes, a plain collar having no port and no device can be slidably mounted over the O-rings to prevent air passage beyond the air-tight region. The end user can quickly and easily replace the plain collar with a collar-equipped device suited to a particular application.

10 Claims, 3 Drawing Sheets

VALVE STEM WITH SLIDABLE, ROTATABLE AIR-TIGHT COUPLING FOR REMOVABLY ATTACHABLE DEVICES

TECHNICAL FIELD

This invention provides a tire valve stem having a coupling for removably attaching a device such as a pressure gauge to the valve stem without impeding access to the valve and in a manner which allows the device to be rotatably positioned with respect to the valve stem.

BACKGROUND

It is well known that vehicle tires should be maintained within the tire inflation pressure range recommended by the manufacturer in order to prolong tire life and maximize vehicle handling characteristics. It is particularly important to maintain large commercial tires within the recommended tire inflation pressure. Such tires are expensive and susceptible to damage if operated for prolonged intervals at improper inflation pressures. Replacing such tires is time consuming, labour intensive and expensive. Moreover, significant loss of production time costs can be incurred if the equipment on which such tires are mounted is taken out of service for tire replacement.

The prior art has addressed the foregoing problems in a variety of ways. For example, a miniature manually actuated pressure gauge can be threaded over the end of the tire valve stem and left in place during normal operation of the vehicle. The vehicle operator or a maintenance worker actuates the gauge, typically by pressing a button on the gauge to admit air through the valve into the gauge, to obtain a tire pressure reading. However, because such devices protrude from the end of the valve stem, they are prone to breakage upon contact with foreign objects. This is a particularly acute problem in off road environments, in which many large commercial tires are operated. The gauge portion of the device can be broken away, leaving the threaded coupling portion of the device on the valve stem in a condition which allows air to leak from the tire through the valve.

Another prior art approach is to replace the tire valve stem with a custom stem having an integral "T" type connection on the side of the stem. A miniature pressure gauge is mounted on the "T" connection. This recesses the gauge beneath the top of the valve stem, reducing the risk of breakage discussed above. The "T" connection also allows access to the tire valve at all times without removal of the gauge, a problem to which the aforementioned prior art device is subject. However, the "T" connection restricts positioning of the gauge. The gauge's position is fixed by the position of the "T" connection which is a fixed, integral part of the valve stem. The valve stem's position is in turn fixed during initial mounting of the tire and is not easily adjusted thereafter. In most cases very little space is available adjacent the valve stem, necessitating difficult, precise positioning of the "T" connection and gauge. These factors can require provision of many different custom stems and/or gauges to suit different types of tires, rims, etc. The cost implications of limited production runs, maintenance of large inventories of custom parts, etc. are believed to have impeded widespread adoption of "T" connection type devices.

The prior art has also evolved a variety of transducer type devices capable of sensing tire operating parameters such as pressure or temperature and transmitting signals representative of such parameters to remote equipment for display, processing, etc. Yet another prior art approach is to couple a small diameter air conduit to a tire valve and extend the conduit to a remote sensor or transducer. These approaches can solve the positioning problem to which the aforementioned "T" connection type devices are subject, but they tend to be complex and expensive.

SUMMARY OF INVENTION

The present invention provides a simple, inexpensive, tire valve stem having an integral pair of O-rings over which a pressure gauge or other device is easily mounted by sliding a mating collar provided on the device over the O-rings. The O-rings provide an airtight seal against the collar, while allowing rotation of the device with respect to the stem, either during or after mounting, to position the device anywhere within a 360° arc around the stem.

The O-rings are located on either side of an orifice which extends through the valve stem, beneath the valve. Air is thus allowed to pass from the pressurized valve stem, through the orifice, into an air-tight region between the O-rings, valve stem and collar. A port in the collar allows air to pass through the collar from the air-tight region into the device.

A wide variety of devices equipped with collars capable of air-tight, slidable mounting over the O-rings can be provided in addition to the aforementioned pressure gauge. For example, pressure transducers, pressure sensors, temperature gauges, temperature transducers, temperature sensors, or air conduits for coupling to remote equipment can be provided. Any such device can quickly and easily be interchanged with a device previously mounted on the valve stem by sliding the previously mounted device's collar off the valve stem and then sliding another device's collar over the O-rings.

For initial shipping purposes, a plain collar having no port and no gauge or other device can be slidably, sealingly mounted over the O-rings to prevent air passage beyond the air-tight region. The end user can quickly and easily replace the plain collar with a collar-equipped device suited to a particular application.

BRIEF DESCRIPTION OF DRAWINGS

FIG. 3 depicts a tire valve stem, like that of FIGS. 1 and 2, coupled, in accordance with the invention, to an air conduit for a remote transducer, sensor, gauge, or the like.

DESCRIPTION

Figure 1:
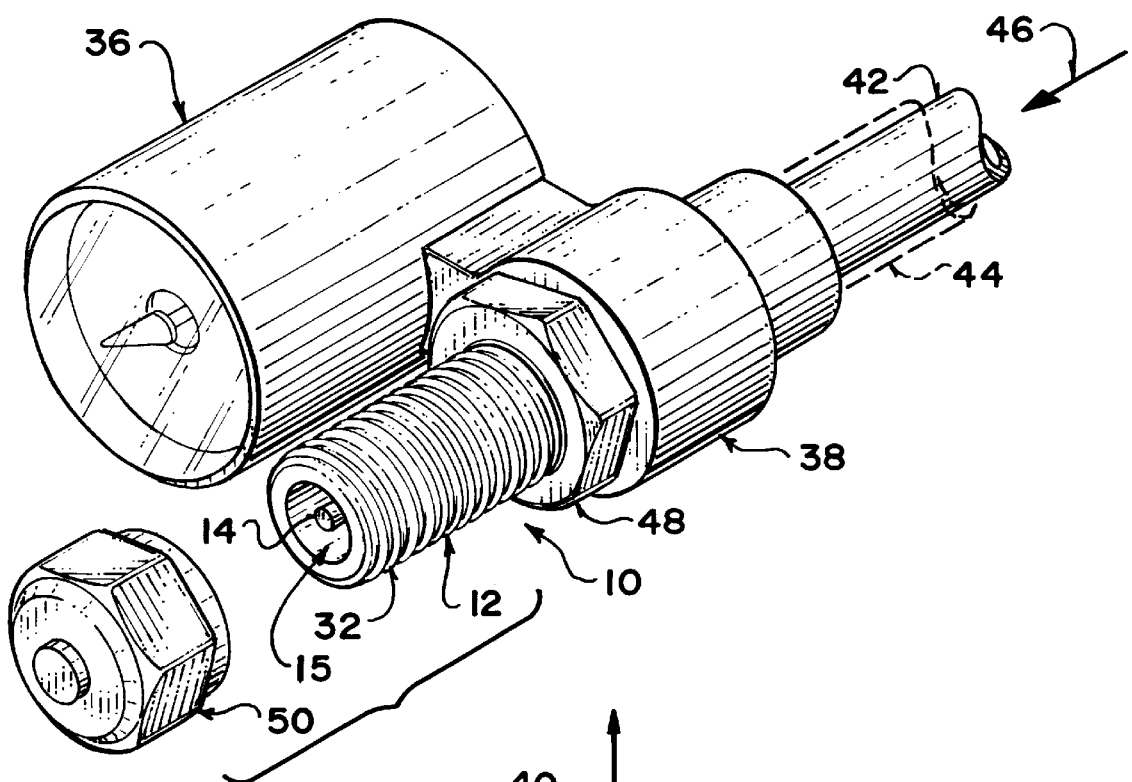
FIG. 1 is a pictorial illustration of a tire valve stem coupled to an air gauge in accordance with the invention.
Figure 2:
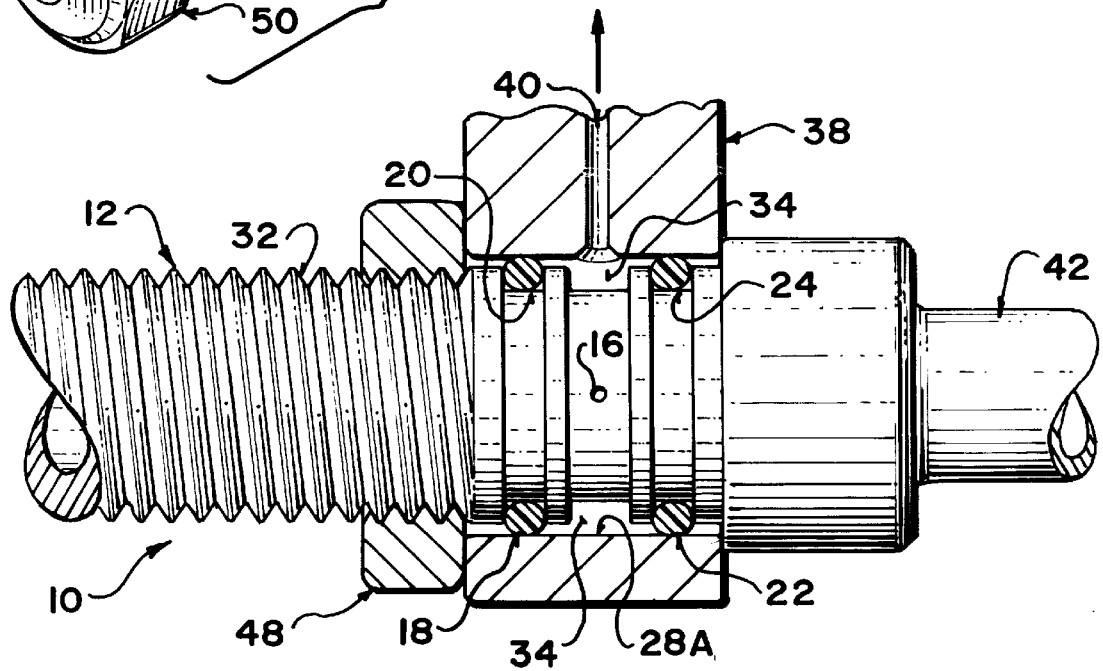
FIG. 2 is a partial cross-sectional view taken longitudinally along a portion of the tire valve stem of FIG. 1.

As best seen in FIG. 2, the invention provides a tire valve 10 having a stem 12 (also known as a "barrel" or "core housing"). A primary tire inflation/deflation orifice 15 in the outer end of stem 12 receives a conventional valve core 14 (FIG. 1) define an air pressurizable region within stem 12. A small diameter secondary orifice 16 extends through stem 12, beneath valve core 14, into the pressurizable region inside stem 12. A first O-ring 18 is seated within circumferential groove 20 machined in stem 12, such that O-ring 18 encircles stem 12 on a first side of orifice 16. A second O-ring 22 is seated within a second groove 24 such that O-ring 22 encircles stem 12 on a second side of orifice 16, opposite the first side.

Figure 6:
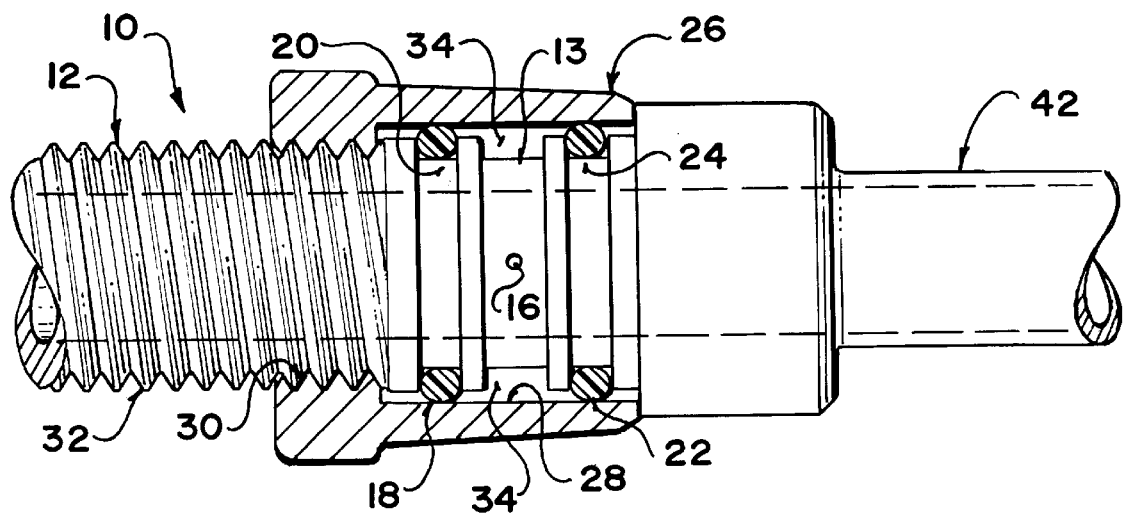
FIG. 6 is a partial cross-sectional view taken longitudinally along a portion of a tire valve stem like that of FIGS. 1 and 2, showing a non-ported sealing collar in place.

Valve stem 12 serves a number of purposes, as will now be described. FIG. 6 shows a sealing collar 26 having a smooth bore internal region 28 and an internally threaded region 30. The threading in region 30 matches external threading 32 provided on that portion of valve stem 12 encircling valve core 14. Collar 26 can thus be threadably fastened on valve stem 12 as shown in FIG. 6. Such fastening slidably, rotatably and sealingly engages smooth bore region 28 over O-rings 18, 22, thereby defining a generally annular, air-tight region 34 between O-rings 18, 22, the external wall 13 of stem 12 and the internal smooth bore region 28 of collar 26.

Orifice 16 permits air to pass through stem 12 between the aforementioned pressurizable region within stem 12 and air-tight region 34. It will thus be understood that collar 26 can be threaded on stem 12 to prevent air passage beyond air-tight region 34. This is useful, for example, in initial shipping of valve stem 12. An end user can remove collar 26 and substitute another collar-equipped device suited to a particular application, as hereinafter explained.

FIG. 1 depicts a pressure gauge 36 having an integral collar 38. Collar 38 is slidably, rotatably and sealingly mounted over O-rings 18, 22 as described above in relation to collar 26. Unlike collar 26, collar 38 has a port 40 (FIG. 2) which extends through collar 38 into pressure gauge 36. Port 40 thus permits passage of air between air-tight region 34 and an "external region" such as a pressure sensing cavity (not shown) within pressure gauge 36.

As shown in FIGS. 1, 2 and 6, stem 12 can be fitted, in conventional fashion, onto an air coupling shaft 42 over which a protective rubber sleeve 44 may optionally be provided. Pressurized air can be forced through valve core 14, stem 12 and shaft 42 to inflate a tire (not shown). Once the tire is inflated, pressurized air within the tire exerts a pressurizing force through shaft 42, orifice 16, air-tight region 34 and port 40 into the aforementioned "external region", as schematically indicated by arrow 46. If the external region is a pressure sensing cavity, such as that provided within pressure gauge 36, an indication of the tire pressure is provided by pressure gauge 36. Other devices defining external regions providing other functional capabilities can be provided, as explained below.

A threaded lock nut 48 is provided for threadable fastening over the threaded portion 32 of stem 12. It will be noted that the invention permits pressure gauge 36 to be positioned anywhere within a 360° arc relative to the longitudinal axis of stem 12 before lock nut 48 is tightened against collar 38. More particularly, the aforementioned slidable, rotatable, sealing engagement between O-rings 18, 22 and the smooth bore internal region 28A of collar 38 allows collar 38 (and thus its integral pressure gauge 36) to be rotatably positioned during initial slidable mounting of collar 38 over stem 12 and/or after collar 38 is fully seated over O-rings 18, 22 as shown in FIG. 2. This is particularly advantageous in maximizing the range of positions within which pressure gauge 36 can be located, having regard to the many different tire valve mounting configurations encountered in practice. Such configurations are often characterized by very limited space for positioning of devices such as pressure gauge 36. A conventional, internally threaded valve cap 50 is provided for threadable fastening over the open end of stem 12 to protect valve core 14.

Figure 3:
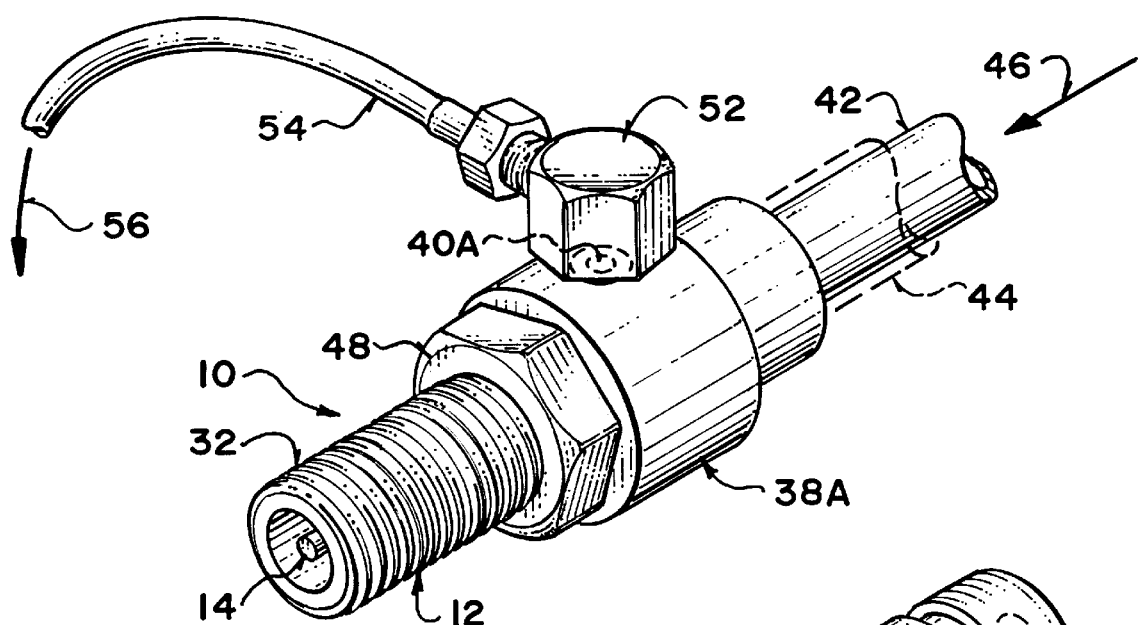

FIG. 3 depicts another embodiment incorporating a stem 12 and a collar 38A which are in most respects identical to stem 12 and collar 38 described above in relation to FIGS. 1, 2 and 6. That is, although not visible in FIG. 3, stem 12 depicted in FIG. 3 is equipped with O-rings and a secondary orifice identical to those seen in FIG. 2. Similarly, collar 38A has a smooth bore internal region which slidably, rotatably and sealingly engages the O-rings to define an air-tight region as previously described. Collar 38A also has a port 40A which permits air passage between the air-tight region within collar 38A and an external region. In the case of the FIG. 3 embodiment, the external region includes an air channel inside a right angle coupler 52 having one end coupled to collar 38A over port 40A, and another end coupled to a small diameter air conduit 54. As indicated by arrow 56, this arrangement permits air passage through conduit 54 from the air-tight region within collar 38A, through the "external region" defined by the air channel within coupler 52, to a remote region such as a pressure sensing cavity provided within a remote pressure gauge (not shown) coupled to the remote end of air conduit 54. It will be understood that many different remote devices such as pressure gauges, pressure transducers, pressure sensors, temperature gauges, temperature sensors, temperature transducers or similar devices can be provided coupled to the remote end of air conduit 54.

Figure 7:
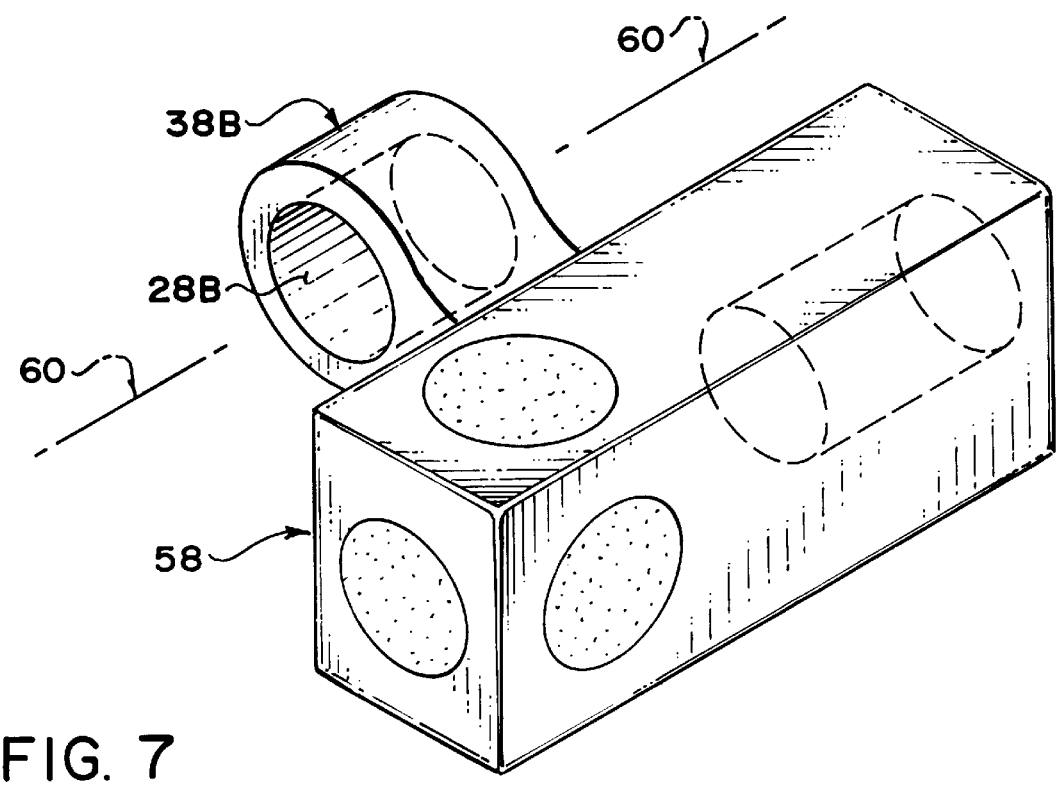
FIG. 7 schematically depicts a battery-powered transducer and transmitter housing having a ported collar slidably and rotatably mountable on a tire valve stem like that of FIGS. 1 and 2.

FIG. 7 shows another collar-equipped device, namely a conventional battery-powered transducer/transmitter 58 having an integral collar 38B with a smooth bore internal region 28B formed in accordance with the invention. Collar 38B is functionally similar to collars 38 and 38A, except that the port (not shown) provided in collar 38B permits air to pass into the transducer portion of transducer-transmitter 58. Collar 38B is easily slidably, rotatably and sealingly mounted on stem 12 as previously described in respect of collars 38 and 38A. It will thus be understood that transducer-transmitter 58 can be positioned anywhere within a 360° relative to the longitudinal axis of stem 12 (such axis being represented in FIG. 7 by line 60). In operation, when transducer-transmitter 58 is mounted on stem 12 as aforesaid, pressurized air is able to pass through the stem's secondary orifice, through the air-tight region defined between stem 12 and collar 38B, through the port in collar 38B and into the transducer portion of transducer-transmitter 58. The transducer produces a signal representative of a parameter of interest during normal driving operation of the vehicle supported by the tire on which stem 12 and transducer/transmitter 58 are mounted, interest, and the signal is then transmitted to a remote receiver (not shown). Transducer-transmitter 58 may be a temperature gauge, a temperature sensor, a pressure transducer, a temperature transducer, etc.

Figure 4:
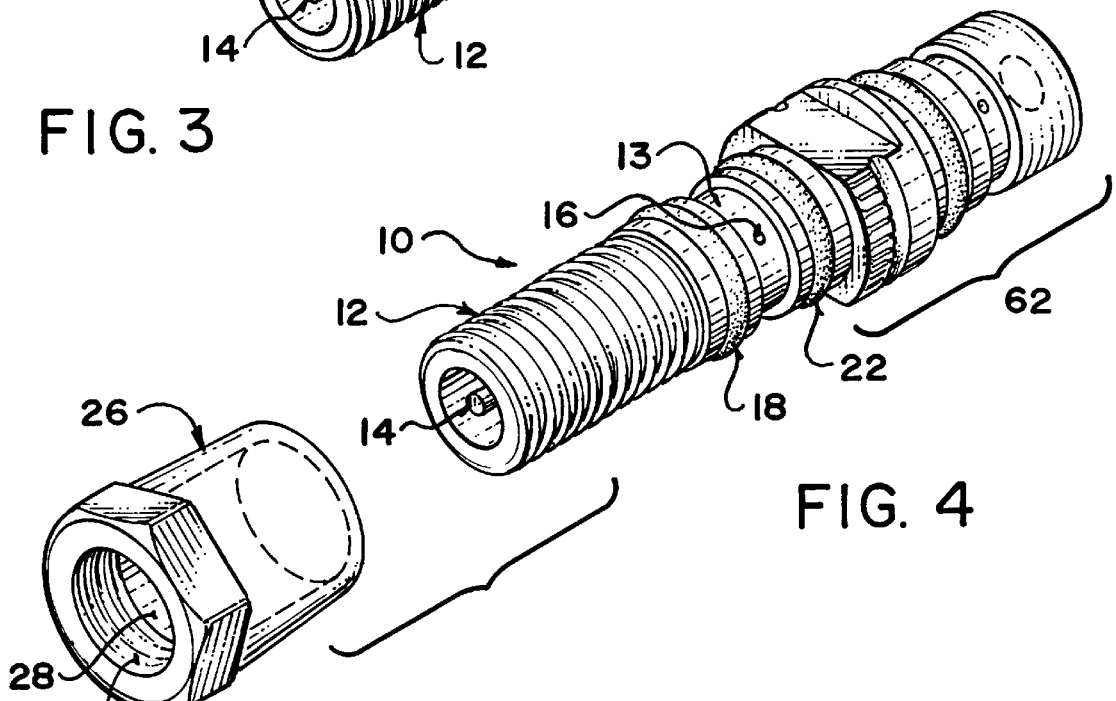
FIG. 4 is a pictorial illustration of a tire valve stem, like that of FIGS. 1 and 2, adapted for use in a "super large bore" tire inflation system, and shows a non-ported sealing collar.
Figure 5:
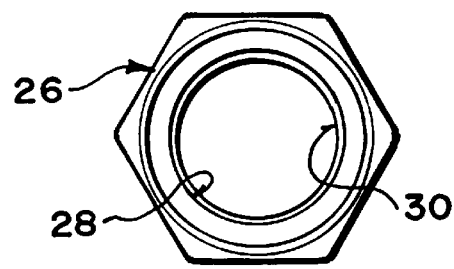
FIG. 5 is a front view of the non-ported sealing collar shown in FIG. 4.

FIG. 4 shows how stem 12 may include a conventional adapter portion 62 of the type used in "super large bore" tire inflation systems. FIG. 4, together with FIG. 5, also depicts the previously described non-ported sealing collar 26.

As will be apparent to those skilled in the art in the light of the foregoing disclosure, many alterations and modifications are possible in the practice of this invention without departing from the spirit or scope thereof. For example, a wide variety of pressure gauges, pressure transducers, pressure sensors, temperature gauges, temperature sensors, temperature transducers or similar devices can be provided with ported collars similar to collars 38, 38A or 38B. Any such device having a suitably ported collar can quickly and easily be removably installed on stem 12 as previously described. A tire valve incorporating stem 12, with a selected device removably installed thereon, can be mounted on a vehicle tire such that the valve, stem and device move longitudinally and rotatably with the tire during normal driving operation of the vehicle.

It is not necessary to deflate the tire in order to install or replace such devices. The relatively small diameter of orifice 16 prevents substantial loss of air pressure during the brief interval required to interchange collars or collar-equipped devices on stem 12. If no device is required, sealing collar 26 can be left in place to maintain normal operation of tire valve 10. Valve core 14 remains fully accessible with collar 26 or any of collars 38, 38A or 38B and their associated devices in place on stem 12. Tire inflation devices such as centrifugal pumps can also be coupled to stem 12 via similar ported collars, enabling pressurized air to be forced from a remote region, through the collar's port, into the air-tight region within the collar, through the stem's secondary orifice and into the pressurizable region inside the stem.

If desired, stem 12 can be quickly retrofitted on top of a pre-installed prior art valve stem. This is accomplished by providing a suitable internally threaded coupling (not shown) on the end of stem 12 opposite that containing valve core 14. Any valve core remaining within the pre-installed prior art valve stem is removed, and stem 12 is then threaded over the open end of the pre-installed prior art valve stem by means of the aforementioned coupling. The benefits of the invention can thus be made available quickly, without the need for time consuming removal of pre-installed prior art valve stems and installation of stem 12 within the vehicle tire.

Persons skilled in the art will be familiar with prior art extension tubes which are commonly used in mounting prior art valve stems in accessible locations. The present invention can also be used with such extension tubes. In particular, stem 12 can be fixed on one end of such an extension tube (not shown). A suitable prior art coupling (not shown) can be provided on the end of the extension tube opposite that to which stem 12 is fixed.

The scope of the invention is to be construed in accordance with the substance defined by the following claims.

What is claimed is:

1. A tire valve mountable on and longitudinally and rotatably movable with a vehicle-mounted tire during normal driving operation of said vehicle, said tire valve comprising:

(a) a stem for supporting a valve core, said valve core receivable in said stem through a primary tire inflation/deflation orifice in an outer end of said stem to define a pressurizable region within said stem during said normal driving operation of said vehicle;

(b) a secondary orifice extending through said stem into said pressurizable region;

(c) a first O-ring encircling said stem on one side of said secondary orifice; and, (d) a second O-ring encircling said stem on another side of said secondary orifice, opposite to said one side.

2. A tire valve as defined in claim 1, further comprising a collar slidably and rotatably sealingly mountable over said O-rings to define an air-tight region between said O-rings, said stem and said collar; said secondary orifice permitting air passage through said stem between said pressurizable region and said air-tight region during said normal driving operation of said vehicle.

3. A tire valve as defined in claim 2, further comprising a port in said collar for air passage through said port between said air-tight region and an external region during said normal driving operation of said vehicle.

4. A tire valve as defined in claim 3, further comprising a pressure gauge on said collar, said pressure gauge containing said external region.

5. A tire valve as defined in claim 3, further comprising a temperature gauge on said collar, said temperature gauge containing said external region.

6. A tire valve as defined in claim 3, further comprising a pressure sensor said collar, said pressure sensor containing said external region.

7. A tire valve as defined in claim 3, further comprising a temperature sensor said collar, said temperature sensor containing said external region.

8. A tire valve as defined in claim 3, further comprising a pressure transducer on said collar, said pressure transducer containing said external region.

9. A tire valve as defined in claim 3, further comprising a temperature transducer on said collar, said temperature transducer containing said external region.

10. A tire valve as defined in claim 3, further comprising an air conduit having one end coupled to said collar for air passage through said conduit between said external region and a remote region.

* * * * *